(12) United States Patent
Carr et al.

(10) Patent No.: US 10,200,618 B2
(45) Date of Patent: Feb. 5, 2019

(54) AUTOMATIC DEVICE OPERATION AND OBJECT TRACKING BASED ON LEARNING OF SMOOTH PREDICTORS

(71) Applicant: Disney Enterprises, Inc., Burbank, CA (US)

(72) Inventors: George Peter Carr, Pittsburgh, PA (US); Jianhui Chen, Burbank, CA (US); Yisong Yue, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 268 days.

(21) Appl. No.: 14/881,010

(22) Filed: Oct. 12, 2015

(65) Prior Publication Data
US 2016/0277646 A1 Sep. 22, 2016

Related U.S. Application Data

(63) Continuation-in-part of application No. 14/660,629, filed on Mar. 17, 2015.

(51) Int. Cl.
*H04N 7/18* (2006.01)
*H04N 5/232* (2006.01)
(Continued)

(52) U.S. Cl.
CPC ......... *H04N 5/23296* (2013.01); *G06T 7/277* (2017.01); *G06T 2207/10016* (2013.01);
(Continued)

(58) Field of Classification Search
CPC ................. G06T 2207/20081; H04N 5/247
See application file for complete search history.

(56) References Cited

U.S. PATENT DOCUMENTS

| 2008/0117296 A1* | 5/2008 | Egnal | H04N 7/181 |
| | | | 348/143 |
| 2008/0225651 A1* | 9/2008 | Waites | G11B 27/034 |
| | | | 369/4 |

OTHER PUBLICATIONS

Hu et al ("A Real Time Dual-Camera Surveillance System Based on Tracking-Learning-Detection Algorithm"; School of Aeronautics and Astronautics, Shanghai Jiao Tong University, Shanghai 200240, China; pp. 1-6; Date: 2013; URL: http://ieeexplore.ieee.org/xpls/icp.jsp?arnumber=6561048).*

(Continued)

*Primary Examiner* — Sathyanaraya V Perungavoor
*Assistant Examiner* — Peet Dhillon
(74) *Attorney, Agent, or Firm* — Patterson + Sheridan, LLP (57) ABSTRACT

The disclosure provides an approach for predicting trajectories for real-time capture of video and object tracking, while adhering to smoothness constraints so that predictions are not excessively jittery. In one embodiment, a temporally consistent search and learn (TC-SEARN) algorithm is applied to train a regressor for camera planning. A automatic broadcasting application first receives video input captured by a human-operated camera and another video input captured by a stationary camera with a wide field of view. The automatic broadcasting application extracts feature vectors and pan-tilt-zoom states from the stationary camera input and human-operated camera input, respectively. The automatic broadcasting application further applies the TC-SEARN algorithm to learn a sequential regressor for predicting camera trajectories, based on the extracted feature vectors and pan-tilt-zoom states. The TC-SEARN algorithm itself is able to learn the regressor using a loss function which enables decision trees to reason about spatiotemporal smoothness via an autoregressive function.

18 Claims, 6 Drawing Sheets

(51) Int. Cl.
*G06T 7/277* (2017.01)
*H04N 5/247* (2006.01)
(52) U.S. Cl.
CPC ............... *G06T 2207/20081* (2013.01); *G06T 2207/30241* (2013.01); *G06T 2207/30244* (2013.01); *H04N 5/247* (2013.01)

(56) References Cited

OTHER PUBLICATIONS

"Learning Online Smooth Predictors for Realtime Camera Planning", ICCV 2015 Submission #1177, 11 pgs, 2015.
P. Carr, Y. Sheikh, and I. Matthews. Monocular object detection using 3D geometric primitives. In ECCV, 2012. 14 pages.
J. Chen and P. Carr. Autonomous camera systems: A survey. In Workshops at the Twenty-Eighth AAAI Conference on Artificial Intelligence, 2014, 5 pages.
J. Chen and P. Carr. Mimicking human camera operators. In Applications of Computer Vision (WACV), 2015 IEEEWinter Conference on, pp. 215-222. IEEE, 2015.
A. Criminisi, J. Shotton, and E. Konukoglu. Decision Forests: A Unified Framework for Classification, Regression, Density Estimation, Manifold Learning and Semi-Supervised Learning, vol. 7, pp. 81-227. NOW Publishers, 2012.
H. Daum'e lii, J. Langford, and D. Marcu. Search-based structured prediction. Machine learning, 75(3):297-325, 2009.
A. J. Davison, I. D. Reid, N. D. Molton, and O. Stasse. Monoslam: Real-time single camera slam. Pattern Analysis and Machine Intelligence, IEEE Transactions on, 29(6):1052-1067, 2007.
T. G. Dietterich. Ensemble methods in machine learning. In Multiple classifier systems, pp. 1-15. Springer, 2000.
T. G. Dietterich. Machine learning for sequential data: A review. In Structural, syntactic, and statistical pattern recognition, pp. 15-30. Springer, 2002.
S. R. Fanello, C. Keskin, P. Kohli, S. Izadi, J. Shotton, A. Criminisi, U. Pattacini, and T. Paek. Filter forests for learning data-dependent convolutional kernels. In Computer Vision and Pattern Recognition (CVPR), 2014 IEEE Conference on, pp. 1709-1716. IEEE, 2014.
P. Geurts, D. Ernst, and L.Wehenkel. Extremely randomized trees. Machine learning, 63(1):3-42, 2006.
J. Lee and S. Y. Shin. General construction of time-domain filters for orientation data. Visualization and Computer Graphics, IEEE Transactions on, 8(2):119-128, 2002.
F. Liu, M. Gleicher, H. Jin, and A. Agarwala. Contentpreserving warps for 3d video stabilization. In ACM Transactions on Graphics (TOG), vol. 28, p. 44. ACM, 2009.
F. Liu, M. Gleicher, J. Wang, H. Jin, and A. Agarwala. Subspace video stabilization. ACM Transactions on Graphics (TOG), 30(1):4, 2011.
N. Payet and S. Todorovic. Sledge: Sequential labeling of image edges for boundary detection. International journal of computer vision, 104(1):15-37, 2013.N. Payet and S. Todorovic. Sledge: Sequential labeling of image edges for boundary detection. International journal of computer vision, 104(1):15-37, 2013.
G. Rogez, J. Rihan, S. Ramalingam, C. Orrite, and P. H. Torr. Randomized trees for human pose detection. In Computer Vision and Pattern Recognition, 2008. CVPR 2008. IEEE Conference on, pp. 1-8. IEEE, 2008.
J. Schimert and A. Wineland. Coupling a dynamic linear model with random forest regression to estimate engine wear. In Annual Conference of the Prognostics and Health Management Society, 2010.

* cited by examiner

AUTOMATIC DEVICE OPERATION AND OBJECT TRACKING BASED ON LEARNING OF SMOOTH PREDICTORS

CROSS-REFERENCE TO RELATED APPLICATIONS

This application is a continuation-in-part of co-pending U.S. patent application Ser. No. 14/660,629, filed Mar. 17, 2015, which is hereby incorporated by reference in its entirety.

BACKGROUND

Field of the Invention

This disclosure provides techniques for automatically operating a device or tracking a device's or an object's states. More specifically, embodiments of this disclosure present techniques for learning smooth predictors for automatic device operation and object tracking.

Description of the Related Art

Automatic broadcasting, in which autonomous camera systems capture video, can make small events, such as lectures and amateur sporting competitions, available to much larger audiences. Autonomous camera systems generally need the capability to sense the environment, decide where to point a camera (or cameras) when recording, and ensure the cameras remain fixated on intended targets. Traditionally, autonomous camera systems follow an object-tracking paradigm, such as "follow the lecturer," and implement camera planning (i.e., determining where the camera should look) by smoothing the data from the object tracking, which tends to be noisy. Such autonomous camera systems typically include hand-coded equations which determine where to point each camera. One problem with such systems is that, unlike human camera operators, hand-coded autonomous camera systems cannot anticipate action and frame their shots with sufficient "lead room." As a result, the output videos produced by such systems tend to look robotic, particularly for dynamic activities such as sporting events. Another problem is that automatically generated camera plans can be jittery, causing the camera to rapidly change from one position to another rather than gradually changing the camera angle. A jittery signal can be filtered after the fact to smooth out the signal, but such smoothing does not learn temporal patterns or account for the context of the original signal. For example, applying too much filtering can prevent the motion of the camera from changing quickly, and the camera may then be unable to track a fast moving object. Experience has shown that it can be difficult to manually tune the post-processing smoothing to ensure the system is not over or under damped, as there is typically a tradeoff between smoothing the signal and inducing delay.

SUMMARY

One embodiment of this disclosure provides a computer-implemented method for operating a first device. The method generally includes receiving operational data of a second device, the operational data generated based on manual operation of the second device at a first operating site and receiving sensory data associated with the first operating site, the operational data and the sensory data being temporally associated. The method further includes extracting feature vectors from the sensory data and training a regressor based on the operational data and the feature vectors, thereby generating a trained regressor, wherein the training employs a temporally consistent search and learn (TC-SEARN) method. In addition, the method includes operating the first device using the trained regressor, which receives as input new feature vectors extracted from new sensory data associated with a second operating site.

Another embodiment provides a computer-implemented method for tracking a first object. The method generally includes receiving data representing states of a second object and receiving sensory data that is temporally associated with the states of the second object. The method further includes extracting feature vectors from the sensory data and training a regressor based on the second object state data and the feature vectors, thereby generating a trained regressor, wherein the training employs a temporally consistent search and learn (TC-SEARN) method. In addition, the method includes tracking the first object using the trained regressor, which receives as input new feature vectors extracted from new sensory data.

Further embodiments include non-transitory computer-readable storage media storing instructions that when executed by a computer system cause the computer system to perform the methods set forth above, and computer systems programmed to carry out the methods set forth above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation

DETAILED DESCRIPTION

This disclosure provides techniques for an autonomous camera system that predicts camera trajectories for real-time capture of video, while adhering to smoothness constraints so that the predicted trajectories are not excessively jittery. As used herein, "smooth" refers to the deviation from one camera angle prediction to the next being less than a given amount. In one embodiment, a modified, temporally consistent search and learn (TC-SEARN) algorithm is applied to train a regressor for camera planning. An automatic broadcasting application may first receive one video input captured by a human-operated camera and another video input captured by an auxiliary camera (e.g. a stationary camera with a wide field of view). The automatic broadcasting application then extracts feature vectors and operational data (e.g. pan-tilt-zoom states) from the auxiliary camera input and the human-operated camera input, respectively. The automatic broadcasting application further applies the TC-SEARN algorithm to learn a sequential regressor, based on the extracted feature vectors and the pan-tilt-zoom states. Unlike the traditional SEARN algorithm, which learns a classifier, the TC-SEARN algorithm learns a regressor using a new loss function which enables decision trees to reason about spatiotemporal smoothness via an autoregressive function. In particular, the data-driven regressor is conditioned on previous predictions, rather than starting from scratch each time, which allows learning of temporal patterns within data, in addition to any direct feature-based relationships. The TC-SEARN makes the training problem relatively efficient by decoupling this recursive formulation (similar to reinforcement learning) using an auxiliary reference signal, thereby allowing the predictor to be learned efficiently using supervised techniques. In addition, the new loss function that is used in the TC-SEARN algorithm balances reconstruction error against temporal smoothness by incorporating an autoregressive model directly into decision tree training.

The regressor that is learned through the TC-SEARN algorithm is a function that receives feature vectors as inputs and outputs pan-tilt-zoom settings that change smoothly over time and are also predictive of what a human camera operator would choose. The automatic broadcasting application may apply such a learned regressor to determine target pan-tilt-zoom settings when recording a new scene and controlling an autonomous camera to achieve the target settings. As a result, the autonomous camera may record the new scene in a manner that is smooth and resembles the work of a human operator in similar situations.

Although discussed herein primarily with respect to receiving pan-tilt-zoom states from one video input captured by a human operated camera and extracting feature vectors from another video input captured by an auxiliary camera, techniques disclosed herein may be generalized to any human demonstration input (and not just a video captured by a human) indicating where a camera or other device is pointing, such as pan and tilt values collected by electronic sensors embedded in an "instrumented" camera tripod. Further, techniques disclosed herein may make use of any sensory data (and not just video captured by an auxiliary camera) from sensing the environment and related events, such as RADAR data, radio frequency identification (RFID) tracking data, scoreboard data for a game, etc. Techniques disclosed herein may also be adapted for use with cameras whose positions are not fixed (e.g., handheld cameras) and devices other than cameras, such as directional microphones and spotlights, whose operation by a human may be taken as demonstration input that, together with sensory data, is used to train a regressor for generating planned device settings predictive of human operation of the handheld camera, directional microphone, spotlight, or other device. In such cases, the device settings may include pan-tilt-zoom and position settings (for the handheld camera), pan and tilt settings (for the microphone and spotlight), or any other appropriate settings associated with the device that may be chosen by a human operator whose operation of the device may then be mimicked by training a regressor. In addition, techniques disclosed herein may be used to track objects, as discussed in greater detail below.

Although a basketball game is used as a reference example herein, and panning is the primary pan-tilt-zoom change for typical basketball game videos, techniques disclosed herein are also applicable to other sports and scenes (e.g., meeting a character at a theme park). In general, techniques disclosed herein do not rely on specific domain knowledge, except the regressor that is learned. Further, techniques disclosed herein may be adapted to scenes where tilting or zooming are more important camera behaviors.

Figure 1:
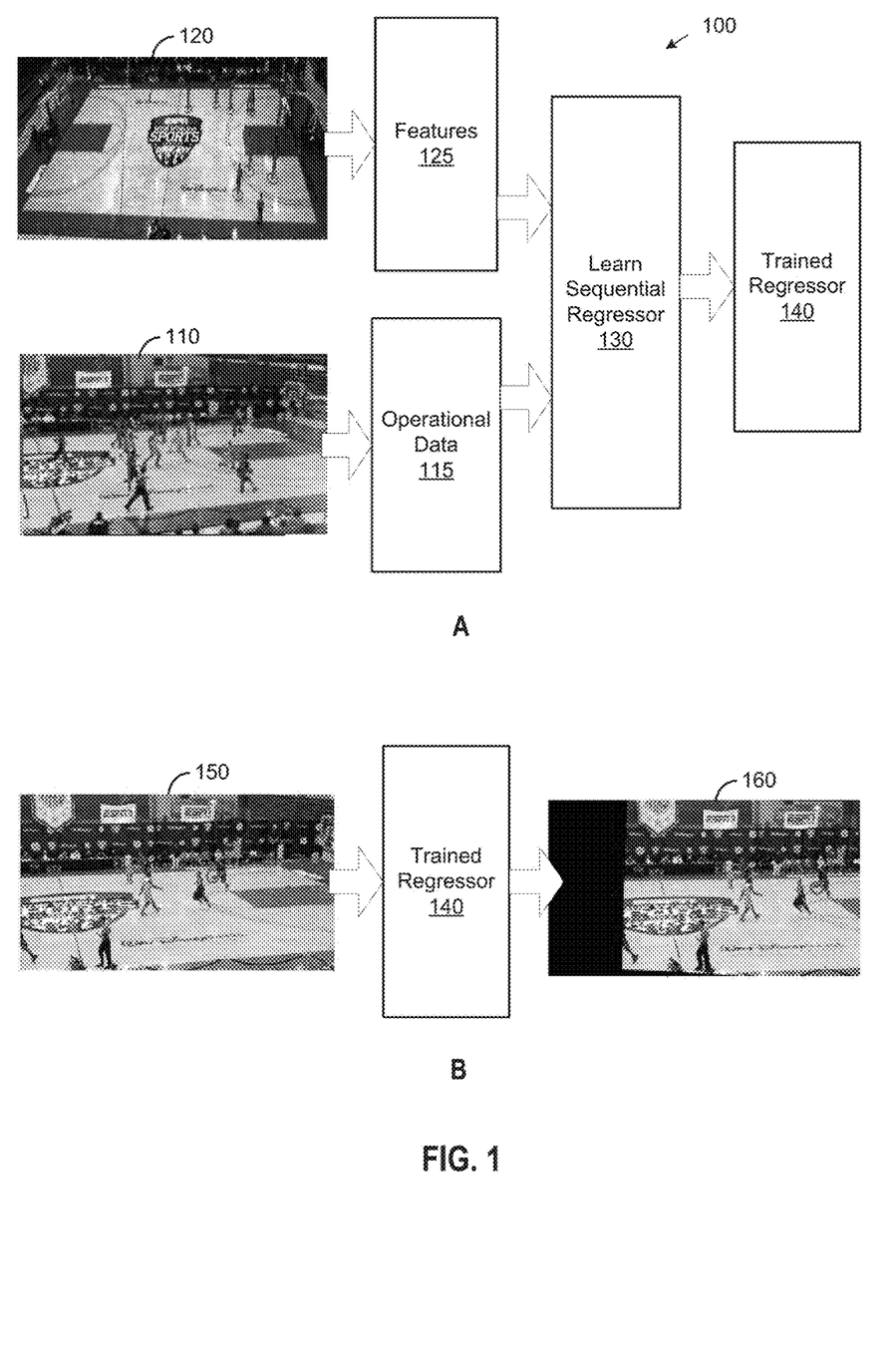
FIG. 1 illustrates an approach for training a system to smoothly capture videos, according to an embodiment.

FIG. 1 illustrates an approach for training a system to smoothly capture video, according to an embodiment. As shown in panel A, an automatic broadcasting application receives video inputs 110 and 120 from two cameras capturing the same event, in this example, a basketball game. A first video input 110 is captured by a human-operated camera. A second video input 120 is captured by an auxiliary camera, for example, a stationary camera with a wider field of view, such as a camera with a higher vantage point of the game or with different lens settings. Given the video inputs 110 and 120, the automatic broadcasting application extracts feature vectors 125 from the second video input 120 and exemplary camera pan-tilt-zoom states 115 from the first video input 110. As discussed in greater detail below, the feature vectors 125 may include, e.g., a centroid, heat map, or spherical map that describes player locations in the second video input 120. In videos of basketball games, it may be assumed that tilt and zoom are constant, as a wide shot is typically maintained with a mostly constant tilt angle.

Automated camera planning generally assumes that there is an underlying function $f: X \mapsto Y$ that describes ideal camera work that should occur at a time instant. Such a function takes an input one or more of the extracted feature vectors 125 at time t, represented hereinafter as $x_t$, and outputs a pan angle $y_t$ at which the camera should be looking. The goal of automated camera planning is then to learn a predictor $h(\cdot) \approx f$ that can determine a pan angle $\hat{y}_t$ for the camera, with $\hat{y}_t$ ideally being similar to the ideal angle $y_t$. In one embodiment, the predictor $h(\cdot)$ 140 is a regressor that is learned 130 and the prediction $\hat{y}_t$ is made based on the current input data $x_t$ as well as $\tau$ previous input data $\{x_{t-1}, \ldots, x_{t-\tau}\}$ and previous predictions $\{\hat{y}_{t-1}, \hat{y}_{t-2}, \ldots, \hat{y}_{t-\tau}\}$:

$$\hat{y}_t = h(x_t, x_{t-1}, \ldots, x_{t-\tau}, \hat{y}_{t-1}, \hat{y}_{t-2}, \ldots, \hat{y}_{t-\tau}). \quad (1)$$

Conditioning the current prediction on previous predictions in this manner allows the regressor to learn about inherent temporal relationships. However, when the current prediction is based on previous predictions, the estimation of the regressor $h(\cdot)$ 140 can become difficult, as it is nontrivial to extract a set of independent training examples to use with a conventional supervised learning algorithm. Instead, the regressor $h(\cdot)$ 140 must be recursively iterated from the starting position to see how well the planned camera angles match the ideal camera path. In practice, traditional approaches split such a sequential prediction problem into two stages: generating independent per-frame estimates using only current and previous input features $$\hat{y}_t' = h_{TI}(x_t, x_{t-1}, \ldots, x_{t-\tau}), \quad (2)$$

and applying a subsequent autoregressive filtering operation to ensure temporal smoothness $$\hat{y}_t = h_{AR}(\hat{y}_t', \hat{y}_{t-1}', \hat{y}_{t-2}', \ldots, \hat{y}_{t-\tau}'). \quad (3)$$

As discussed, such filtering does not account for the context of the original signal, and it can also be difficult to tune the post-processing smoothing to ensure the system is not over or under damped if the signal has dynamic noise patterns and realtime response is required.

In contrast, the automatic broadcasting application according to one embodiment learns smooth spatiotemporal patterns directly from input data by applying a TC-SEARN algorithm to learn a sequential regressor. The TC-SEARN algorithm is discussed in greater detail below and solves equation (1) in a more holistic manner rather than taking the typical two-phase approach of first learning an independent per-frame predictor and then applying temporal smoothing after the fact. The TC-SEARN algorithm further allows the efficient optimization of a loss function which enables decision trees to reason about spatiotemporal smoothness via an autoregressive function.

After training the regressor h(•) 140, the automatic broadcasting application uses the trained regressor 140 to generate planned pan-tilt-zoom settings for an autonomous robotic camera based on feature vectors extracted from new sensory data 150, as shown in panel B. Once generated, the automatic broadcasting application may control motors in the autonomous robotic camera to achieve the planned pan-tilt-zoom settings and capture video 160. Alternatively, a stationary camera (e.g., the camera capturing the video 150) may be used to capture a wide field of view (e.g., an entire basketball court), and the automatic broadcasting application may sample this captured video to generate a video that appears as if it were captured by a camera with the planned pan-tilt-zoom settings.

Figure 2:
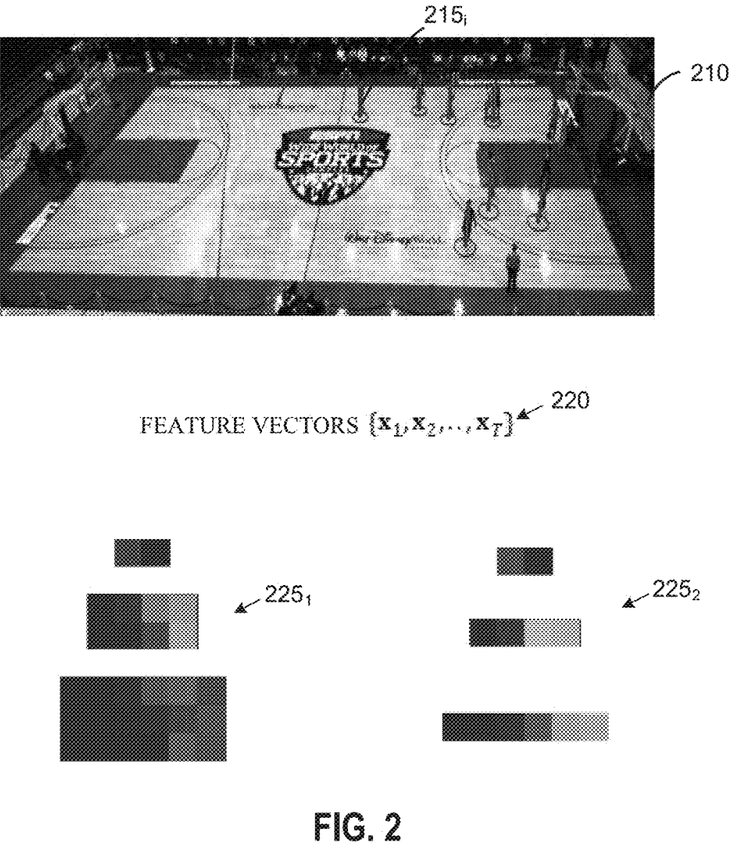
FIG. 2 illustrates example features extracted from input video, according to an embodiment.

FIG. 2 illustrates example features extracted from input videos 120 and 150, according to an embodiment. As shown, a frame 210 from a video captured by a stationary camera has a wide field of view depicting an entire basketball court. The automatic broadcasting application detects elements in the received sensory data (e.g. frame 210). For a video frame, for example, the automatic broadcasting application may subtract a background (the basketball court) and analyze the results in terms of bounding regions representing each foreground element $215_i$ (e.g, by modeling basketball players as 3D cylinders). The actual detections may be akin to noisy versions of RFID tracking data, and the sensory data is ultimately encoded into a set of feature vectors $\{x_1, x_2, \ldots, x_T\}$ 220 spanning the temporal duration of the training data. Of course, actual RFID tracking data may also be employed.

In one embodiment, to minimize the impact of missed and false player detections, the automatic broadcasting application may analyze the frame data in frame chunks, such as τ=12 frame chunks (≈0.5 s), and greedily fit constant velocity models to the detection data using random sample consensus (RANSAC). In such a case, temporal window t would contain a set $T_t=\{T_1,T_2, \ldots T_{N_t}\}$ of short constant velocity trajectories. Because the number of trajectories is not necessarily constants for all temporal chunks, a fixed-length feature vector $x_t$ must be extracted from the noisy tracking results for each temporal chunk. That is, the automatic broadcasting application obtains a feature vector $x_t$ for each temporal window of sensory data (e.g., noisy player trajectories), producing the set of feature vectors $\{x_1, x_2, \ldots, x_T\}$ 220.

Three possible feature vectors $x_t$ are: a centroid, a heat map $225_1$, and a spherical map $225_2$. These and other feature vectors may be used alone or in conjunction with one another to train a regressor. The centroid may generally be defined as the 2-dimensional feature vector $x_t^{centroid}$ with the average (x, y) location of all players during temporal chunk t. Although discussed herein primarily with respect to player locations, the feature vector may also (or instead) include data from other signals, such as game time, game state data (e.g., scoreboard data), among other things. That is, information about the event being trained for capture by the autonomous camera system may be informed with sensory data such as the game time, game state, etc. In addition, player locations themselves may also be tracked using other techniques, such as RFID, and such RFID signals could be part of the feature representation.

The automatic broadcasting application may generate a heat map, such as the heat map $225_1$, by dividing the basketball court into a 2D grid, counting the number of players within each cell of the grid, and assigning the counts to the appropriate elements of feature vector $x_t^{heat\ map}$. In one embodiment, to minimize quantization effects (i.e., errors from trying to fit players into grid cells), the automatic broadcasting application can linearly interpolate each player's count between the four neighboring cells of the grid (above, below, left, and right). Additionally, by changing the resolution of the grid, the automatic broadcasting application may generate heat maps at different scales. In a particular embodiment, three resolutions may be used: 2×1, 4×2, and 6×3. In such a case, the automatic broadcasting application may stack the heat maps of the three different scales together to form a 28-dimension feature vector.

The automatic broadcasting application may generate a spherical heat map $x_t^{spherical\ map}$, such as the spherical map $225_2$, on the unit sphere of the camera. The spherical map is useful for predicting a pan angle of a pan-tilt-zoom camera in particular, where there is an inherent non-linear spherical projection between a world coordinate system and a pan-tilt-zoom domain of the camera. With the spherical map, player locations may be projected onto the unit sphere, and the automatic broadcasting application may then count the number of players within each cell of the spherical map grid to generate $x_t^{spherical\ map}$. As discussed, only the pan axis is quantized in this case, which assumes that the tilt and zoom values are mostly constant and may not be necessary to estimate for capturing certain events such as basketball in which a wide shot is maintained with a mostly constant tilt angle. In a particular embodiment, spherical heat maps may be generated for resolutions 1×2, 1×4, and 1×8. Similar to the heat map discussed above, the spherical heat map scales may be stacked to build a 14-dimension feature vector. Unlike the heat map in the world coordinate system, the spherical heat map is specific to a particular camera location C, and the spherical map is effectively a polar quantization of the player positions on the basketball court. That is, the spherical map provides counts of the number of players in angular regions of a unit sphere representing the camera.

Figure 3:
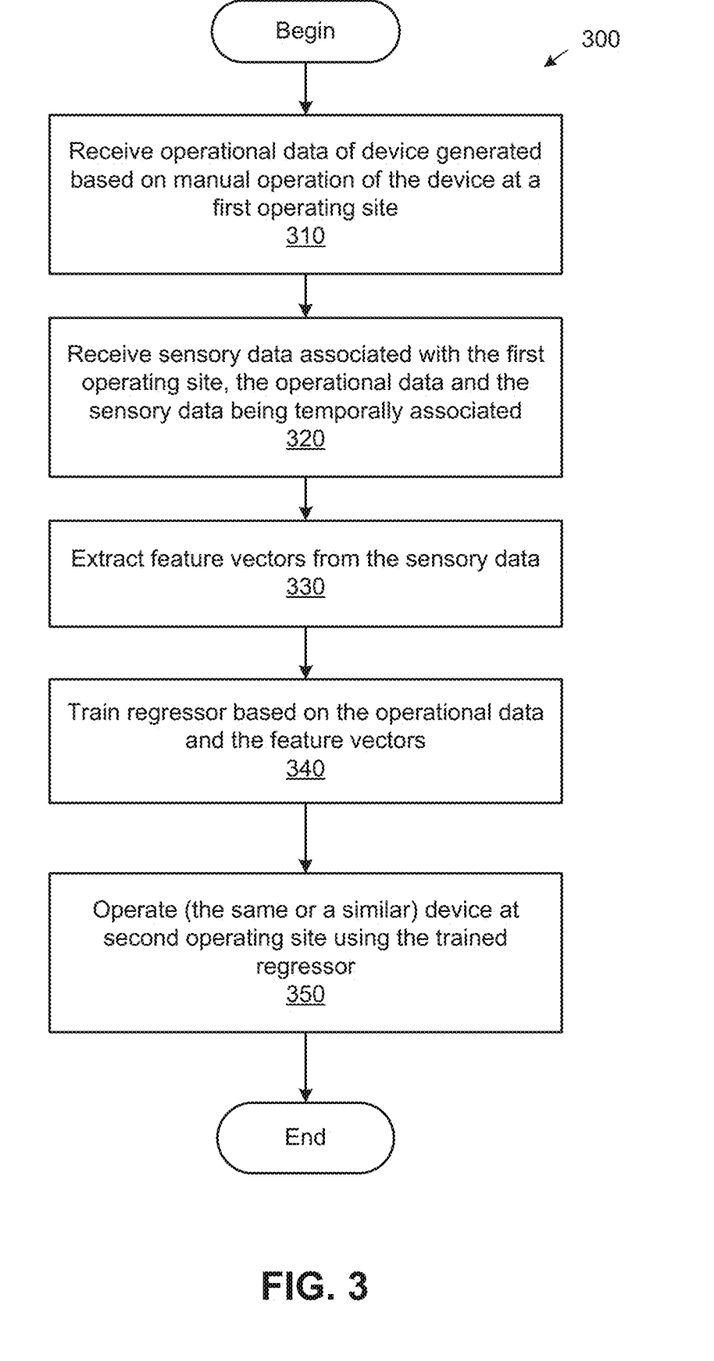
FIG. 3 illustrates a method for operating a device such as a camera, according to an embodiment.

FIG. 3 illustrates a method 300 for operating a device such as a camera, according to an embodiment. As shown, the method 300 begins at step 310, where an automatic broadcasting application receives operational data of a device generated based on manual operation of the device at a first operating site. That is, the automatic broadcasting application receives or itself determines device settings in a human-operated demonstration. For example, the automatic broadcasting application may receive (or determine) camera pan-tilt-zoom states $y_t$ of a human-operated camera video. The set of trajectory values spanning the temporal duration of the training data is represented herein as $\{y_1, y_2, \ldots, y_T\}$. In one embodiment, the pan-tilt-zoom states $y_t$ may be simplified to just pan angles. As discussed, only considering pan angles may be sufficient for generating a model for an autonomous camera to record some events such as basketball games in which a wide shot zoom is maintained along with a generally constant tilt angle. The pinhole model is frequently used to describe the projective aspects of a camera, and the automatic broadcasting application may determine camera pan angles using the pinhole model in one embodiment. In another embodiment, the automatic broadcasting application may use a revised pan-tilt-zoom model set forth in U.S. patent application Ser. No. 14/660,629, filed Mar. 17, 2015, which improves upon the pinhole model.

At step 320, the automatic broadcasting application receives sensory data associated with the first operating site, the operational data and the sensory data being temporally associated. In one embodiment, the sensory data may include video input from a stationary auxiliary camera with a wide field of view, as discussed above.

At step 330, the automatic broadcasting application extracts feature vectors from the sensory data that describe, for example, locations of objects or people. In one embodiment, the automatic broadcasting application may first detect players and their trajectories within video frames captured by an auxiliary camera by subtracting a background and analyzing the results in terms of 3D cylinders, such as by analyzing frame chunks and greedily fitting constant velocity models to the detection data using RANSAC. Of course, other foreground object detection and tracking approaches could be used. Alternatively, the object positions could be sensed directly using RFID tags or other means. The automatic broadcasting application then extracts a feature vector $x_t$ for each temporal window of sensory data (e.g., noisy player trajectories), producing the set of feature vectors $\{x_1, x_2, \ldots, x_T\}$ spanning the temporal duration of the training data. As noted relative to FIG. 2, examples of feature vectors may include a centroid, a heat map, and a spherical map. In an alternative embodiment, the feature vector could include other data, such as game time, game state (e.g., number of points scored), etc. (again, using domain knowledge can inform the modeling of the automatic camera planning, but is not required to mimic human camera operator).

At step 340, the automatic broadcasting application trains a regressor $h(\cdot)$, based on the operational data and the feature vectors, for predicting device settings for new situations in additional sensory data. For example, the goal of such learning may be to obtain the sequential predictor (the regressor) $h(\cdot)$ which can hypothesize a smooth sequence $\hat{Y}=[\hat{y}_1, \hat{y}_2, \ldots]$ of pan angles for capturing video, the pan angles also closely resembling the expected behavior $Y=[y_1, y_2, \ldots]$ of a human camera operator. Here, "resembles" means the estimated trajectory is spatially close to the ideal trajectory and also exhibits similar motion characteristics. The Y is referred to herein as the true values or the ground truth. In one embodiment, the automatic broadcasting application may search for the sequential regressor $h(\cdot)$ by minimizing a spatiotemporal loss function of the form $$L_{D+S}(\hat{Y}) = D(\hat{Y}) + wS(\hat{Y}). \tag{4}$$

The spatiotemporal loss function of equation (4) combines a mean-squared error term describing the spatial discrepancy $D(\hat{Y})$ between the predictions of the regressor and the demonstrated pan-tilt-zoom values $$D(\hat{Y}) = \frac{1}{T}\sum_{t=1}^{T}(\hat{y}_t - y_t)^2, \tag{5}$$

along with the deviation of the current prediction from its autoregressed value $\check{y}_t$ of previously estimated pan-tilt-zoom values, which gauges how well the motion characteristics of the regressor match the motion characteristics in the human demonstration.

$$S(\hat{Y}) = \frac{1}{T-\tau}\sum_{t=\tau+1}^{T}(\hat{y}_t - \check{y}_t)^2. \tag{6}$$

Here, the autoregression function estimates the current camera position $\check{y}_t$ by linearly extrapolating previous positions $$\check{y}_t = \Sigma_{i=1}^{\tau} c_i \hat{y}_{t-i}, \tag{7}$$

where the coefficients $\{c_i\}$ may be learned through least squares regression to windowed samples of the training data. Alternatively, a model free autoregressive function, such as a decision tree, which does not assume a linear relationship (although the linear assumption is normally reasonable for most systems) may be used. The autoregressive function describes the motion characteristics of the camera, such as inertia and viscous damping. In the absence of feature data, it describes the expected future location of the camera by extrapolating its current trajectory. In short, the spatiotemporal loss function of equation (4) balances adherence to the training data based on the spatial discrepancy $D(\hat{Y})$ and smoothness $S(\hat{Y})$ based on deviation from the autoregressed value, with the coefficient w controlling the importance of maintaining smoothness relative to tracking error. Use of the loss function of equation (4) can essentially incorporate a Kalman filter directly into decision tree training. Note, the smoothness loss of equation (6) is dependent on previous predictions, making the problem difficult to solve, and traditional approaches instead attempt to solve the equations (5) and (6) sequentially by training a regressor and later smoothing the output of the regressor.

Figure 4:
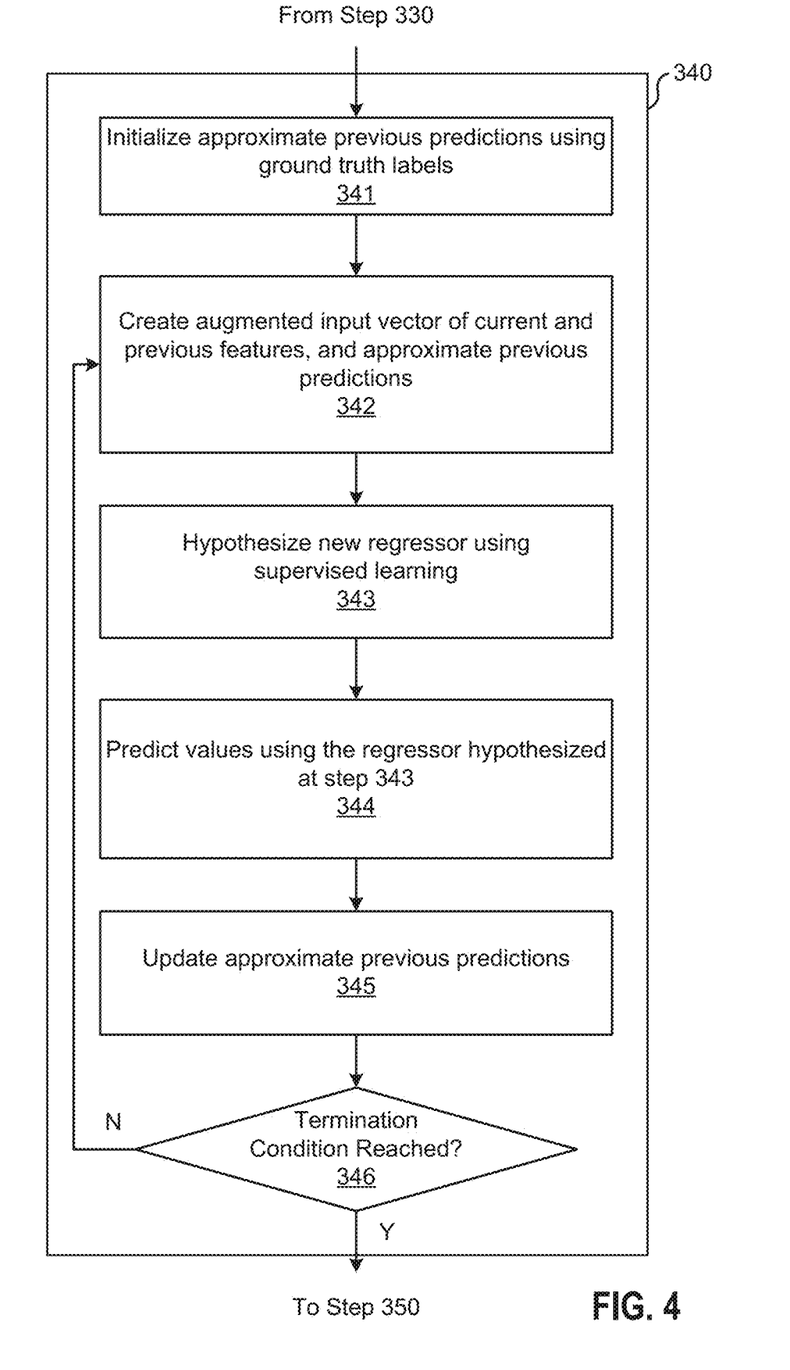
FIG. 4 illustrates in greater detail steps of a temporally consistent search and learn (TC-SEARN) algorithm, according to an embodiment.

In one embodiment, the automatic broadcasting application may employ the TC-SEARN algorithm set forth in Table 1 and discussed in greater detail with respect to FIG. 4 to minimize the loss function of equation (4).

TABLE 1

| Algorithm 1: Temporally Consistent SEARN |
|---|
| Input: Features X, True Values Y, Regression Algorithm π, Step Size β, Termination Condition n. |
| Output: Sequential Predictor h(·) |
| 1:   Initialize approximate previous predictions using true labels<br>    $\tilde{Y} \leftarrow Y$ |
| 2:   for i ← 1 to n do |
| 3:   Create augmented input vector of current and previous features, and approximated previous predictions<br>    $\tilde{x}_t \leftarrow [x_t, x_{t-1}, \ldots, x_{t-\tau}, \tilde{y}_{t-1}, \tilde{y}_{t-2}, \ldots, \tilde{y}_{t-\tau}]$ |
| 5:   Hypothesize regressor via supervised learning<br>    $\tilde{h} \leftarrow \pi(\tilde{X}, Y)$ |
| 6:   Predict values in a sequential fashion<br>    $\hat{y}_t \leftarrow \tilde{h}([x_t, x_{t-1}, \ldots, x_{t-\tau}, \hat{y}_{t-1}, \hat{y}_{t-2}, \ldots, \hat{y}_{t-\tau}])$ |
| 7:   Update approximate previous predictions<br>    $\tilde{Y} \leftarrow \beta\hat{Y} + (1-\beta)\tilde{Y}$ |
| 8:   end for |

Recall that the inputs are features $\{x_t, x_{t-1}, \ldots, x_T\}$ extracted from training videos and spanning the temporal duration of the training data, as well as the initial trajectory values $\{y_1, y_2, \ldots, y_\tau\}$. The goal of learning is then to obtain a one step look-ahead predictor $\hat{y}_t = h(x_t, x_{t-1}, \ldots, x_{t-\tau}, \hat{y}_{t-1}, \hat{y}_{t-2}, \ldots \hat{y}_{t-\tau})$ from the input data such that, when applied sequentially for times $t \in [\tau+1, T]$, the predictor $h(\cdot)$ generates an appropriate reconstruction $\hat{Y}$ of the training examples Y. Because the predictions are coupled: (1) any error made at time t will propagate to all subsequent predictions, and (2) traditional supervised learning approaches are not directly applicable because the previous predictions necessary for generating the training example at time t are not available until after a predictor has been learned. However, supervised learning algorithms can be used to learn a sequential predictor by (1) approximating the unknown previous predictions and (2) using a sliding window to generate T-τ independent training examples. Possible ways to approximate the unknown previous predictions are to use the output of a non-recurrent predictor, or to use the ground truth. In either case, the impact of the approximation is minimized by iterating the learning process: the approximation for the current iteration is the label sequence generated by the sequential predictor learned in the previous iteration. Let $\tilde{Y}$ be the predicted label sequence from the previous iteration. The learning problem then becomes $$\hat{y}_t = \tilde{h}(x_t, x_{t-1}, \ldots, x_{t-\tau}, \tilde{y}_{t-1}, \tilde{y}_{t-2}, \ldots, \tilde{y}_{t-\tau}). \tag{8}$$

Unlike the original recursive formulation discussed above, the SEARN learning algorithm has access not only to the current and previous features, but also the previous auxiliary values. Further, there is no dependence on previous predictions. As a result, the predictor $\tilde{h}(\bullet)$ may be estimated using any supervised learning algorithm π because $\tilde{Y}$ is known at training time. In addition, the spatiotemporal loss function of equation (4) can be minimized using the SEARN algorithm.

In one embodiment, the regression algorithm π used may be decision tree regression. Of course, other regression algorithms such as linear regression, support vector regression, extremely randomized trees, and filter forests; among other things, may be used in other embodiments. Training a decision tree in particular involves analyzing data and arbitrarily testing a number of splitting decisions to see which is best. When the tree is built, a number of questions (e.g., is one part of a basketball court occupied? is another part of court occupied?, etc.) lead to collections of examples from the human-operated input that should have similar pan angles. The loss function of equation (4) provides a means to determine whether the questions are good questions or not. The spatial discrepancy of equation (5) in particular provides the average pan position by computing the sum of pan angles and dividing by the total. The smoothing loss of equation (6) further takes into account smoothness and motion continuity by essentially asking, given previous predictions, what would we expect the current prediction to be? That is, in equation (4), equation (6) modifies equation (5) by also taking into account where the camera was previously looking and how consistent the motion extrapolation is in the previous and current frames. The mathematics of decision tree regression for TC-SEARN are discussed in greater detail below with respect to FIG. 4.

At step 350, the automatic broadcasting application operates the (same or a similar) device at a second operating site using the trained regressor. It should be understood that the second operating site may be the same as the first operating site or different from the first operating site. To operate the device (or the similar device), the automatic broadcasting application may generate planned device settings using the trained regressor for new sensory data. For example, the automatic broadcasting application may generate planned pan-tilt-zoom setting for a new video using the learned regressor $h(\bullet)$. That is, given sensory data describing the environment (e.g., a video feed from a camera with a wide field of view) capturing an event after the regressor $h(\bullet)$ is trained, the automatic broadcasting application extracts, for each time window, a feature vector $x_t$ using the same feature extraction algorithm employed during training (e.g., the centroid, heat map, or spherical map). The automatic broadcasting application then inputs these features into the learned regressor $h(\bullet)$, which outputs planned pan-tilt-zoom setting $\hat{y}_t$ for the new video corresponding to the regressor's prediction of the pan-tilt-zoom configuration that would have been chosen by a human camera operator.

In practice, the output of the learned sequential regressor $h(\bullet)$ may or may not be smooth enough to be used directly. In one embodiment, an addition post-processing smoothing via, e.g., a Kalman filter may be applied to further smooth the output pan-tilt-zoom values. As the output is already significantly less jittery than that of a time-independent regressor, such post-processing smoothing is generally easier to perform than for output from the time-independent regressor.

After obtaining the planned pan-tilt-zoom setting $\hat{y}_t$ for the new video output by the regressor $h(\bullet)$ (and perhaps applying further post-processing smoothing), the automatic broadcasting application controls the device (or another device) using the planned settings. For example, the automatic broadcasting application may control an autonomous robotic camera to achieve the planned pan-tilt-zoom settings. Doing so may include, e.g., executing a separate algorithm which determines signals that need to be sent to the autonomous robotic camera to control servo motors to achieve the desired pan-tilt-zoom settings. Such an algorithm may be, e.g., PID control loop. Alternatively, a stationary camera may capture a wide field of view (e.g., an entire basketball court), and the automatic broadcasting application may sample this captured video to generate a video that appears as if it were captured by a camera with the smoothed planned pan-tilt-zoom settings.

FIG. 4 depicts in greater detail the steps of the TC-SEARN algorithm that may be used in step 340 of the method 300, according to an embodiment. As shown, at step 341, the TC-SEARN algorithm initializes approximate (i.e., estimated) previous predictions using ground truth labels (also referred to herein as generating the "auxiliary signal"). The TC-SEARN algorithm may generally take as input features X and demonstration device settings Y determined from training examples of a human operating a device. For example, Y may include trajectories that consist of the camera's pan-tilt-zoom data or the 3D locations the camera pointed at. The TC-SEARN algorithm may also take as input a regression algorithm π, a step size β, and a termination condition n. The approximated predictions Y are initialized to the training data Y itself—i.e., the ground truth—and the learned regressor $\tilde{h}(\bullet)$ is effectively a data-driven motion model. In other words, the algorithm may learn how to predict planned pan-tilt-zoom setting $\hat{y}_t$ given τ previous predictions. In practice, the learned regressor $\tilde{h}(\bullet)$ may not be able to reconstruct the training data Y exactly, but in the next iteration of the TC-SEARN algorithm, the non-perfect reconstruction of the training data is combined with the approximated previous predictions to update the auxiliary signal to use for training a regressor in the next iteration. As discussed in greater detail below, the updated approximate previous predictions (auxiliary signal) may be obtained through linear interpolation as $$\tilde{Y} \leftarrow \beta \tilde{Y} + (1-\beta)\hat{Y}, \tag{9}$$

where the regularization parameter β is used to ensure the new estimate is not too different from the previous estimate.

By starting with an initial auxiliary signal equivalent to the ground truth, the TC-SEARN algorithm effectively solves equation (1) in the opposite order of standard two-phase approaches. Instead of first learning an independent per-frame regressors and then applying temporal smoothing after the fact—i.e., solving equation (2) and then equation (3), TC-SEARN begins by learning the temporal dynamics of the ground truth signal, and in successive iterations incorporates more and more feature-based estimates—i.e., it solves equation (3) first and then gradually introduces equation (2).

Note that temporal smoothness is not explicitly enforced, as doing so would re-couple the prediction problems. Instead, temporal smoothness is implicitly encoded in the auxiliary signal. To ensure the auxiliary signal remains smooth, TC-SEARN regulates the feedforward mechanism by making the approximations of the previous predictions a linear combination of the predictions from the previous iteration and the ground truth. In order to prevent overfitting, the linear interpolation applies successively less weight to the ground truth in subsequent iterations, as discussed in greater detail below.

At step 342, the TC-SEARN algorithm creates an augmented input vector of current and previous features and approximated previous predictions. In the spatiotemporal loss function of equation (4), each training example at time t has an associated true value $y_i$, as well as an autoregressed prediction $\check{y}_i$ from the $\tau$ previous predictions. When constructing a decision tree, the subset of data within each tree node is not necessarily a contiguous temporal span of training data, which means previous predictions are not necessarily available. Instead, augmented feature vectors $\tilde{x}_t \leftarrow [x_t, x_{t-1}, \ldots, x_{t-\tau}, \tilde{y}_{t-1}, \tilde{y}_{t-2}, \ldots, \tilde{y}_{t-\tau}]$ are generated by concatenating current and previous features as well as approximated previous predictions. These augmented feature vectors are used to learn the regressor. Effectively, augmented feature vectors make it possible to compute the spatiotemporal loss of equation (4) for a non-temporally contiguous set of training data, which enables a learning process that balances the reconstruction error of the training values against deviations from an autoregressive smoothness model. That is, augmented feature vectors effectively transform a single training sequence into a set of independent training examples which can be used with standard supervised learning algorithms. Note, the previous predicted values are not traditionally available when training because the predictor has not yet been learned. Three possible heuristics may be used for addressing this problem: (1) using the ground truth labels, (2) using a time independent predictor and then iteratively re-training, and (3) using TC-SEARN, which effectively combines the previous two heuristics along with a learning rate regulator.

At step 343, the TC-SEARN algorithm hypothesizes a regressor using supervised learning. This step is distinguishable from traditional SEARN, in which a classifier (rather than a regressor) is trained for discrete labeling problems. In such discrete problems, the approximation of a previous prediction $\tilde{y}_t$ at a particular iteration cannot be expressed as an interpolation between two labels. Instead, the algorithm must hold the learned classifiers from all iterations in memory, and generate each approximated previous prediction by randomly picking one of the classifiers. As a result, SEARN's memory requirements for discrete problems are large. In contrast, when used for regression problems, the TC-SEARN disclosed herein has minimal overhead beyond the requirements of the supervised learning algorithm $\pi$ that is used to estimate the regressor h(•), because there is no requirement in TC-SEARN that linear interpolation between the current prediction and the corresponding true value must generate discrete values. As a result, only the current estimate of previous predictions have to be held in memory (in addition to any requirements of the supervised learning algorithm).

In one embodiment, the automatic broadcasting application may employ decision tree regression to hypothesize the regressor. That is, the regression algorithm $\pi$ used in step 343 may be decision tree regression. However, as previously noted, decision tree regression is only used herein as an example, and other regression algorithms such as linear regression, support vector regression, extremely randomized trees, and filter forests; among other things, may be used in other embodiments. Where decision tree regression is used, the training data may be recursively partitioned to reduce the loss of equation (4). In particular, a partition $P \subset \{t | 1 \le t \le T\}$ predicts the value $\hat{y}_P^*$ which minimizes the loss function over the partition. In the simple case of mean squared error that is typically used in regression, the optimal prediction for a partition is determined by finding where the derivative of the loss function equals zero $$\hat{y}_{P,D}^* = \mathrm{argmin}_y D(\hat{Y}_P) = 1/|P| \Sigma_{i \in P} y_i \qquad (10)$$

and the optimal prediction is the average of the training values within the partition. In the more complex spatiotemporal loss function of equation (4), each training example at time t has an associated true value $y_i$, as well as an autoregressed prediction $\check{y}_t$ from the $\tau$ previous predictions. As a result, the augmented input vector generated at step 342 may be used to hypothesize the regressor at step 343. Similar to equation (10), the optimal prediction for partition P using the spatiotemporal loss function of equation (4) is then $$\hat{y}_{P,D+S}^* = \underset{y}{\mathrm{argmin}}\; D(\hat{Y}_P) + wS(\hat{Y}_P) \qquad (11)$$

$$= \frac{1}{|P|(1+w)} \sum_{i \in P} (y_i + w\check{y}_i).$$

By incorporating the loss function of equation (4) which balances the mean squared error between the target values Y and the autoregressed extrapolations $\check{Y}$, TC-SEARN ensures smooth predictors are learned.

At step 344, the TC-SEARN algorithm predicts values (e.g., pan-tilt-zoom device settings) using the regressor hypothesized at step 343. That is, the regressor hypothesized at step 343 is immediately applied to predict values in a sequential fashion $\hat{y}_t \leftarrow \hat{h}([x_t, x_{t-1}, \ldots, x_{t-\tau}, \hat{y}_{t-1}, \hat{y}_{t-2}, \ldots, \hat{y}_{t-\tau}])$. Such predictions may later be combined with other predictions and the auxiliary signal in a subsequent iteration at step 345.

At step 345, the TC-SEARN algorithm updates the approximate previous predictions (auxiliary signal). In one embodiment, Equation 9 illustrates how the update is performed with a regularization parameter $\beta$ to ensure the new estimate is not too different from the previous estimate. The regularization parameter $\beta$ modulates how quickly the supervised learning algorithm is able to deviate from the ground truth. As $\beta$ increases towards 1, the feedforward loop created by the auxiliary signal is highly regulated and stays near the ground truth for a longer period of time. Generally, the quality of the solution should increase as the search for a good predictor h(•) is conducted in a slower, less aggressive fashion. The number of required iterations increases exponentially as $\beta$ gets closer to 1. In alternative embodiments, other update methods may be used.

At step 346, TC-SEARN algorithm determines if a termination condition has been met. For example, the terminating condition may be a maximum number of iterations. If the termination condition has not yet been met, the automatic broadcasting application returns to step 341. Otherwise, if the terminating condition has been met, the automatic broadcasting application continues to step 350 and generates planned pan-tilt-zoom setting for new features extracted from new sensory input data using the learned regressor h(•).

Figure 5:
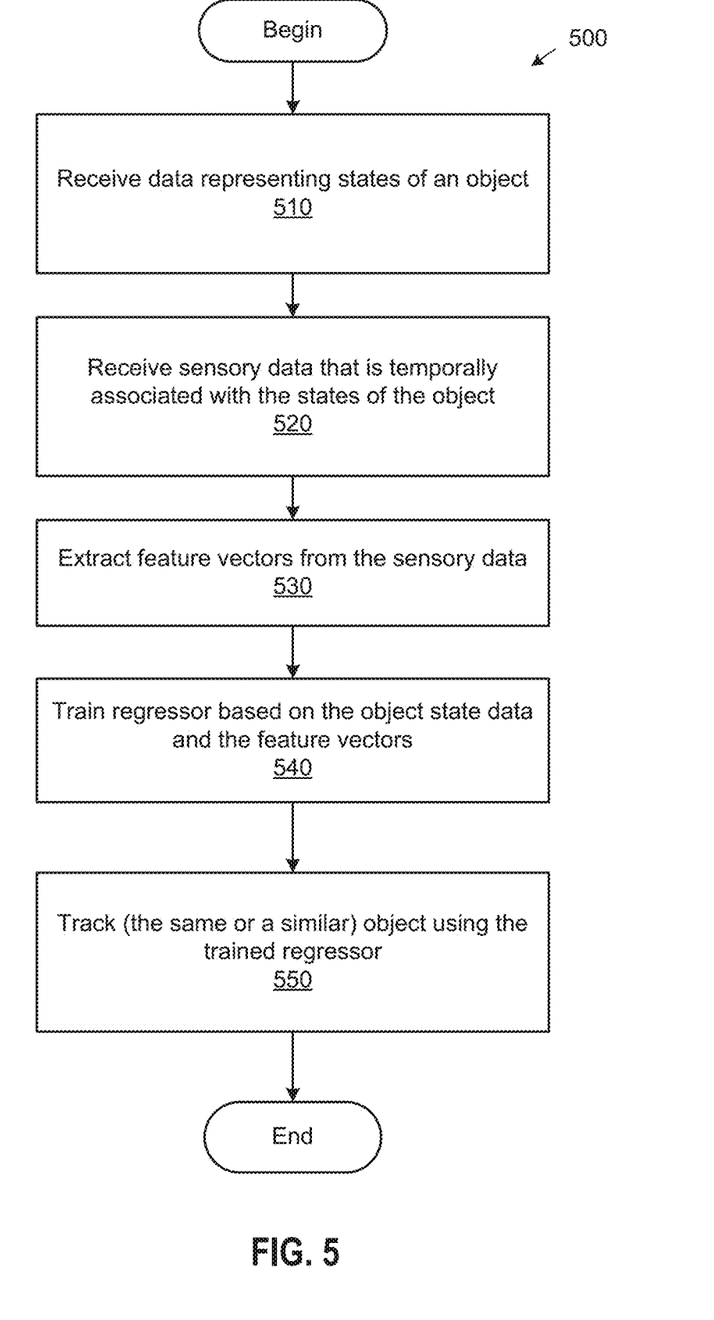
FIG. 5 illustrates a method for tracking an object, according to an embodiment.

Although discussed herein primarily with respect to operating a device, and a camera in particular, techniques disclosed herein may also be employed to make other sequential predictions. For example, techniques disclosed herein may be adapted to track an object (e.g., a ball) by training a regressor using feature vectors extracted from sensory data (especially where there is multi-sensor input such as vision, RFID, radar, etc.) and manually specified states of the object (e.g., positions of the ball). FIG. 5 illustrates such a method 500 for tracking an object, according to an embodiment. As shown, the method 500 begins at step 510, where an object tracking algorithm receives data representing states of an object. For example, the tracking application may receive manually specified positions of the object in a sequence of images.

At step 520, the tracking application receives sensory data that is temporally associated with states of the object. For example, the sensory data may include image data, or any of the other types of sensory data discussed above. Then at step 530, the tracking application extracts feature vectors from the sensory data, similar to step 330 discussed above.

At step 540, the tracking application trains a regressor based on the object state data and the feature vectors. In one embodiment, the regressor may be trained using TC-SEARN, discussed above with respect to FIG. 4, based on the object state data and the feature vectors. The trained regressor may then receive as input new feature vectors extracted from new sensory data and track the same object (or another similar object) in the new sensory data, at step 550.

Figure 6:
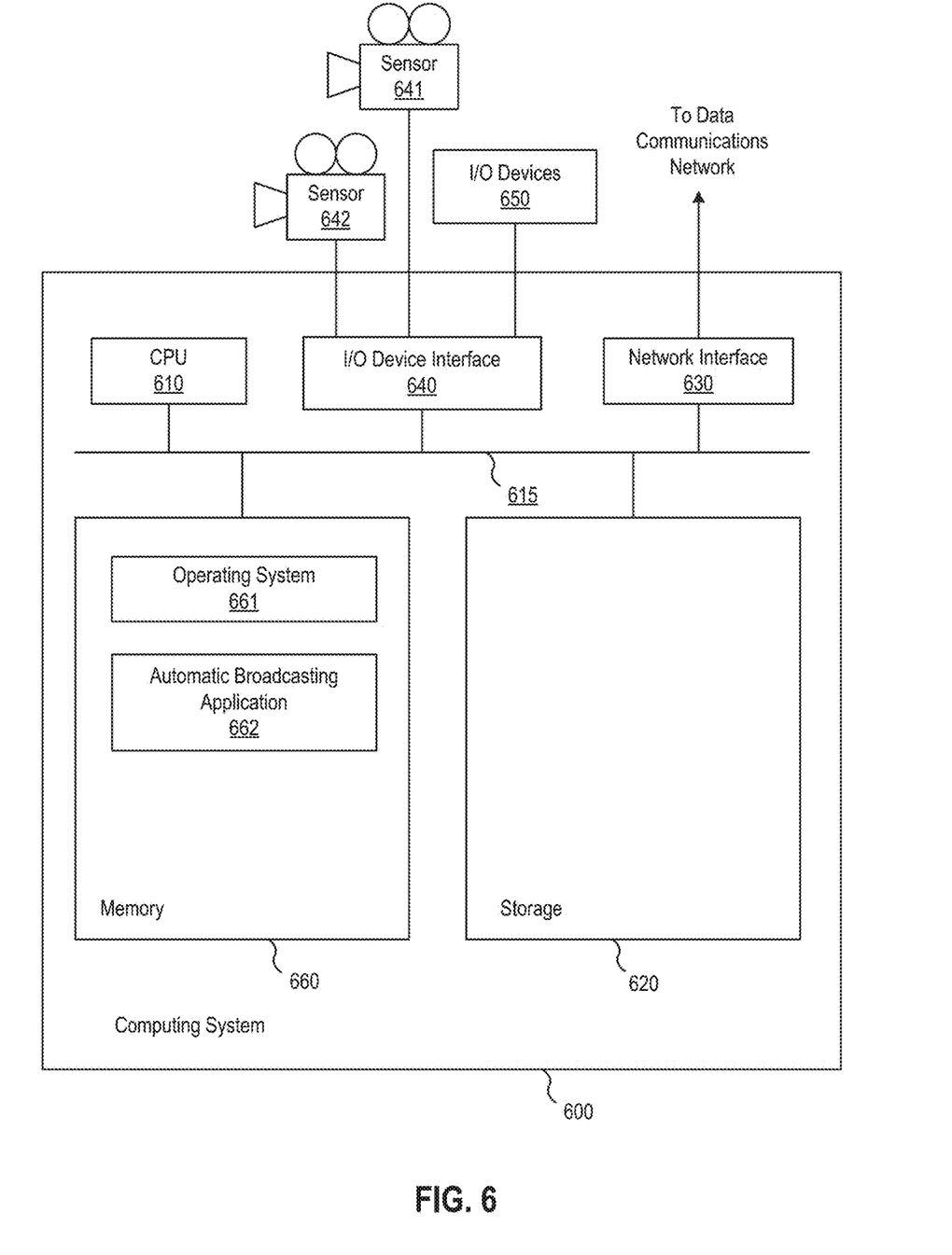
FIG. 6 illustrates a system in which an embodiment may be implemented.

FIG. 6 depicts a block diagram of a system 600 in which an embodiment may be implemented. As shown, the system 600 includes, without limitation, a central processing unit (CPU) 610, a network interface 630, an interconnect 615, a memory 660 and storage 620. The system 600 may also include an I/O device interface 640 connecting I/O devices 650 (e.g., keyboard, display and mouse devices) to the system 600. Illustratively, two sensors 641-642 are connected to the system 600 via the I/O device interface 640. In one embodiment, the sensor 641 may be a camera operated by a human to capture a video 621 of an environment, and the sensor 642 may be an auxiliary camera with typically a wide field of view that captures a second video of the environment. In turn, feature vectors may be determined from the auxiliary camera video and pan-tilt-zoom states from the human-operated camera video, and thereafter used to train a regressor to predict camera setting the human operator would choose. Such predictions output by the trained regressor may further be employed to automatically control the human operated camera 641 or a similar camera to automatically capture video, or alternatively to sample video captured with the auxiliary camera, according to the predictions. Besides cameras, it should be understood that techniques disclosed herein may also use of other types of sensory data such as RADAR data, radio frequency identification (RFID) tracking data, scoreboard data for a game, etc., and the sensors 641-642 may be any appropriate sensors which capture such data.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 510 is representative of one or more of a single CPU, multiple CPUs, a single CPU having multiple processing cores, a graphics processing unit (GPU), and the like. And the memory 660 is generally included to be representative of a random access memory. The storage 620 may be a disk drive storage device. Although shown as a single unit, the storage 620 may be a combination of fixed or removable storage devices, such as fixed disc drives, floppy disc drives, tape drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 660 includes an operating system 661 and an automatic broadcasting application 662. Illustratively, the operating system 661 may include Microsoft's Windows®. The automatic broadcasting application 662 learns and applies a regressor which takes as input a feature vector and outputs pan-tilt-zoom settings predictive of what a human operator would do. In one embodiment, the automatic broadcasting application 662 may be configured to receives input for a human-operated demonstration (e.g., captured using one of the sensors 641-642) and corresponding input sensory data of the environment (e.g., captured using the other sensor 641-642), extract feature vectors describing at least locations of objects from the sensory data, determines device settings in the human-operated demonstration, learn a sequential regressor h(•) for predicting device settings of new situations captured in additional sensory data, generate planned device settings using the trained regressor for new sensory data, and control the sensor device 641 or 642 (or another similar device) using planned settings output by the trained regressor, according to the method 300 discussed above with respect to FIG. 3. In one embodiment, the automatic broadcasting application 662 may further learn the sequential regressor for device settings by updating approximate previous predictions, creating an augmented input vector of current and previous features and approximated previous predictions, hypothesizing a regressor using supervised learning, predicts device settings (e.g., pan-tilt-zoom values) using the hypothesized regressor and input features, reducing the influence of the ground truth, and repeating these steps until a termination condition is met, as discussed above with respect to FIG. 4. Note, although an automatic broadcasting application 662 is depicted, in an alternative embodiment for tracking objects, the object tracking application discussed above with respect to FIG. 5 may be included in the memory 660 instead.

Advantageously, techniques disclosed herein provide a data-driven approach for predicting camera pan-tilt-zoom settings and tracking objects in a manner that changes relatively smoothly over time. A spatiotemporal loss function is introduced that balances adherence to the accuracy and consistency of sequential predictions. The spatiotemporal loss function is optimized using a TC-SEARN algorithm that learns a sequential regressor without relying on the traditional two-step approach of first learning an independent per-frame regressor and then applying temporal smoothing after the fact. As a result, techniques disclosed herein permit realtime prediction and camera control for autonomously recording videos, or object tracking, that are smooth and resemble the work of a human operator in similar situations.

In the foregoing, reference is made to embodiments of the invention. However, it should be understood that the invention is not limited to specific described embodiments. Instead, any combination of the foregoing features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for operating a first device, comprising:
    receiving operational data corresponding to manual operation of a second device at a first operating site;
    receiving sensory data captured using at least one device at the first operating site, the operational data and the sensory data being associated with a same temporal duration;
    extracting feature vectors from the sensory data;
    training a regressor based, at least in part, on the operational data and the feature vectors, thereby generating a trained regressor, wherein the training employs a temporally consistent search and learn (TC-SEARN) method and includes minimizing a spatiotemporal loss function; and
    automatically controlling operation of the first device at a second operating site using the trained regressor, into which additional feature vectors extracted from additional sensory data captured using at least one device at the second operating site are input,
    wherein the operational data includes settings of the second device, and
    wherein each of the sensory data and the additional sensory data include at least one of video data, radio frequency identification (RFID) tracking data, radar data, and scoreboard data.

2. The computer-implemented method of claim 1, wherein the TC-SEARN method includes:
    initializing approximate previous predictions with the received operational data; and
    repeating, for a number of iterations until a termination condition is met, the steps of:
        generating an augmented feature vector including current and previous feature vectors and the approximated previous predictions,
        hypothesizing a new regressor using supervised learning,
        generating predicted operational data using the new regressor, and
        updating the approximated previous predictions with the generated predicted operational data.

3. The computer-implemented method of claim 2, wherein the new regressor is hypothesized via at least one of decision tree regression, linear regression, support vector regression, extremely randomized trees, and filter forests.

4. The computer-implemented method of claim 1, wherein the spatiotemporal loss function has form $L_{D+S}(\hat{Y})=D(\hat{Y})+wS(\hat{Y})$, where $D(\hat{Y})$ is a spatial discrepancy between the received operational data and predicted operational data, $S(\hat{Y})$ is a smoothness discrepancy based at least in part on deviation from an autoregressed value, and w is a coefficient controlling importance of maintaining smoothness relative to spatial discrepancy.

5. The computer-implemented method of claim 1, wherein:
    the second device is a camera;
    the operational data includes camera settings of the camera associated with a first video captured by the camera under control of a human operator;
    the first device is an autonomous camera; and
    the automatically controlling the operation of the first device includes controlling the autonomous camera to capture one or more videos while achieving planned camera settings output by the trained regressor.

6. The computer-implemented method of claim 1, wherein:
    the second device is a camera;
    the operational data includes camera settings of the camera associated with a first video captured by the camera under control of a human operator;
    the first device includes one or more stationary cameras; and
    the automatically controlling the operation of the first device includes capturing videos with the one or more stationary cameras and sampling the videos captured with the one or more stationary cameras based, at least in part, on planned camera settings output by the trained regressor.

7. The computer-implemented method of claim 1, wherein the first operating site and the second operating site are the same site.

8. The computer-implemented method of claim 1, wherein the first device and the second device are the same device.

9. A computer-implemented method for tracking a first object, comprising:
    receiving data representing states of a second object, wherein the states of the second object include locations of the second object;
    receiving sensory data that is captured using at least one device and associated with a same temporal duration as the states of the second object, wherein the sensory data includes at least one of video data, radio frequency identification (RFID) tracking data, radar data, and scoreboard data;
    extracting feature vectors from the sensory data;
    training a regressor based, at least in part, on the second object state data and the feature vectors, thereby generating a trained regressor, wherein the training employs a temporally consistent search and learn (TC-SEARN) method and minimizes a spatiotemporal loss function; and automatically tracking the first object using the trained regressor, into which additional feature vectors extracted from additional sensory data captured using at least one device are input.

10. The computer-implemented method of claim 9, wherein the TC-SEARN method includes:

initializing approximate previous predictions with ground truth labels; and repeating, for a number of iterations until a termination condition is met, the steps of:
generating an augmented feature vector including current and previous feature vectors and the approximated previous predictions,
hypothesizing a new regressor using supervised learning,
generating predicted operational data using the new regressor, and
updating the approximated previous predictions with the generated predicted operational data.

11. The computer-implemented method of claim 10, wherein the new regressor is hypothesized via at least one of decision tree regression, linear regression, support vector regression, extremely randomized trees, and filter forests.

12. The computer-implemented method of claim 9, wherein the spatiotemporal loss function has form $L_{D+S}(\hat{Y})=D(\hat{Y})+wS(\hat{Y})$, where $D(\hat{Y})$ is a spatial discrepancy between the received second object state data and predicted second object state data, $S(\hat{Y})$ is a smoothness discrepancy based at least in part on deviation from an autoregressed value, and w is a coefficient controlling importance of maintaining smoothness relative to spatial discrepancy.

13. The computer-implemented method of claim 9, wherein:
the data representing states of the second object includes manually specified training data; and
the received sensory data includes video data.

14. The computer-implemented method of claim 9, wherein:
the first and second objects are balls; and
the received second object state data specifies locations of the second object ball in a video.

15. The computer-implemented method of claim 9, wherein the first object and the second object are the same object.

16. A non-transitory computer-readable storage medium storing a program, which, when executed by a processor performs operations for operating a first device, the operations comprising:

receiving operational data corresponding to manual operation of a second device at a first operating site.

receiving sensory data captured using at least one device at the first operating site, the operational data and the sensory data being associated with a same temporal duration;

extracting feature vectors from the sensory data;

training a regressor based, at least in part, on the operational data and the feature vectors, thereby generating a trained regressor, wherein the training employs a temporally consistent search and learn (TC-SEARN) method and includes minimizing a spatiotemporal loss function; and automatically controlling operation of the first device at a second operating site using the trained regressor, into which additional feature vectors extracted from additional sensory data captured using at least one device at the second operating site are input, wherein the operational data includes settings of the second device, and wherein each of the sensory data and the additional sensory data include at least one of video data, radio frequency identification (RFID) tracking data, radar data, and scoreboard data.

17. The computer-readable storage medium of claim 16, wherein the TC-SEARN method includes:

initializing approximate previous predictions with the received operational data; and repeating, for a number of iterations until a termination condition is met, the steps of:
generating an augmented feature vector including current and previous feature vectors and the approximated previous predictions,
hypothesizing a new regressor using supervised learning,
generating predicted operational data using the new regressor, and
updating the approximated previous predictions with the generated predicted operational data.

18. The computer-readable storage medium of claim 16, wherein the spatiotemporal loss function has form $L_{D+S}(\hat{Y})=D(\hat{Y})+wS(\hat{Y})$, where $D(\hat{Y})$ is a spatial discrepancy between the received operational data and predicted operational data, $S(\hat{Y})$ is a smoothness discrepancy based at least in part on deviation from an autoregressed value, and w is a coefficient controlling importance of maintaining smoothness relative to spatial discrepancy.

* * * * *

UNITED STATES PATENT AND TRADEMARK OFFICE
CERTIFICATE OF CORRECTION

PATENT NO. : 10,200,618 B2
APPLICATION NO. : 14/881010
DATED : February 5, 2019
INVENTOR(S) : George Peter Carr et al.

It is certified that error appears in the above-identified patent and that said Letters Patent is hereby corrected as shown below:

In the Specification

In Column 2, Line 56, delete "recitation" and insert -- recitation. --, therefor.

In Column 10, Line 47, delete "Y" and insert -- $\tilde{Y}$ --, therefor.

In Column 12, Line 41, delete "Yand" and insert -- Y and --, therefor.

In the Claims

In Column 20, Line 2, in Claim 16, delete "site." and insert -- site; --, therefor.

Signed and Sealed this
Fourth Day of June, 2019

Andrei Iancu
*Director of the United States Patent and Trademark Office*